United States Patent [19]

Mizikar et al.

[11] 3,898,562
[45] Aug. 5, 1975

[54] ADJUSTABLE PROBE HOLDER

[75] Inventors: David M. Mizikar, Mt. Pleasant; George P. Schanzenbach, Greensburg, both of Pa.

[73] Assignee: Carrier Corporation, Syracuse, N.Y.

[22] Filed: May 28, 1974

[21] Appl. No.: 473,627

[52] U.S. Cl. .......................................... 324/158 P
[51] Int. Cl.² ........................................... G01R 1/06
[58] Field of Search ..... 324/158 P, 149, 72.5, 34 E, 324/34 PS, 34 D

[56] References Cited
UNITED STATES PATENTS
3,439,263   4/1969   Broyles, Jr. ....................... 324/149

*Primary Examiner*—Alfred E. Smith
*Assistant Examiner*—Ernest F. Karlsen
*Attorney, Agent, or Firm*—J. Raymond Curtin; Thomas J. Wall

[57] ABSTRACT

A probe supporting structure that is externally insertable into a machine having an adjustable feature for positioning the probe element at a predetermined distance from a body to be observed and scale calibration means for checking the system in assembly.

5 Claims, 3 Drawing Figures

ADJUSTABLE PROBE HOLDER

BACKGROUND OF THE INVENTION

This invention relates to an electrical probe mounting structure and, in particular, to an externally mountable sensing probe suitable for use in a rotary machine and, after initial setup, for providing accurate external positioning of the probe in relation to an internal component without contacting the internal component.

Heretofore, the mounting and/or replacement of a sensing probe in rotary machinery has been a time consuming and relatively complex task. Conventionally, many probes of this type rely upon the Eddy current principle for measuring such things as shaft runout, vibrations, speed, and the like. An RF voltage generator is generally employed to provide a level of voltage that is proportional to the gap distance between the probe sensor elements and the structure being observed. The gap distance between the sensor and the observed body must be accurately controlled so that changes in the voltage output of the RF generator are linear in respect to the distance measured. This linear response can only be obtained within a relatively narrow range. Positive positioning of the probe sensor element in the preferred center of this extremely narrow range with the machine in operation has long been a problem in the art.

SUMMARY OF THE INVENTION

It is therefore an object of the present invention to enable replacement installation of the probe in a machine while in operation and eliminate the risk of accidental probe contact with the rotating shaft.

It is a further object of the present invention to provide an externally mountable sensing probe that can be accurately positioned in regard to an internally supported component contained within a rotary machine.

A still further object of this invention is to accurately position an electrical machine probe within an extremely narrow gap distance in relation to a machine component without having to dismantle or otherwise break down the machine.

It is another object of the present invention to calculate the scale factor of a probe system without removing the probe from assembly.

These and other objects of the present invention are attained by means of an electrical device for sensing distance, vibration or speed of an observed body, within a rotary machine having a sensing probe operatively connected to a voltage generator, an elongated probe holder externally insertable into the machine, to bring the probe in proximity with the observed body, means to place the element in direct contact with the body being observed, means to accurately withdraw the sensing element a predetermined distance from the observed body whereby the element is centered at approximately the midpoint of the linear output range of the voltage generator, means to displace the probe a predetermined distance from the midpoint whereby a scale factor is generated without removing the probe holder from assembly, and locking means for holding the sensor at a predetermined position.

BRIEF DESCRIPTION OF THE DRAWINGS

For a better understanding of the invention, as well as other objects and further features thereof, reference is had to the following detailed description of the invention to be read in conjunction with the accompanying drawings, wherein.

DESCRIPTION OF THE PREFERRED EMBODIMENT

Figure 1:
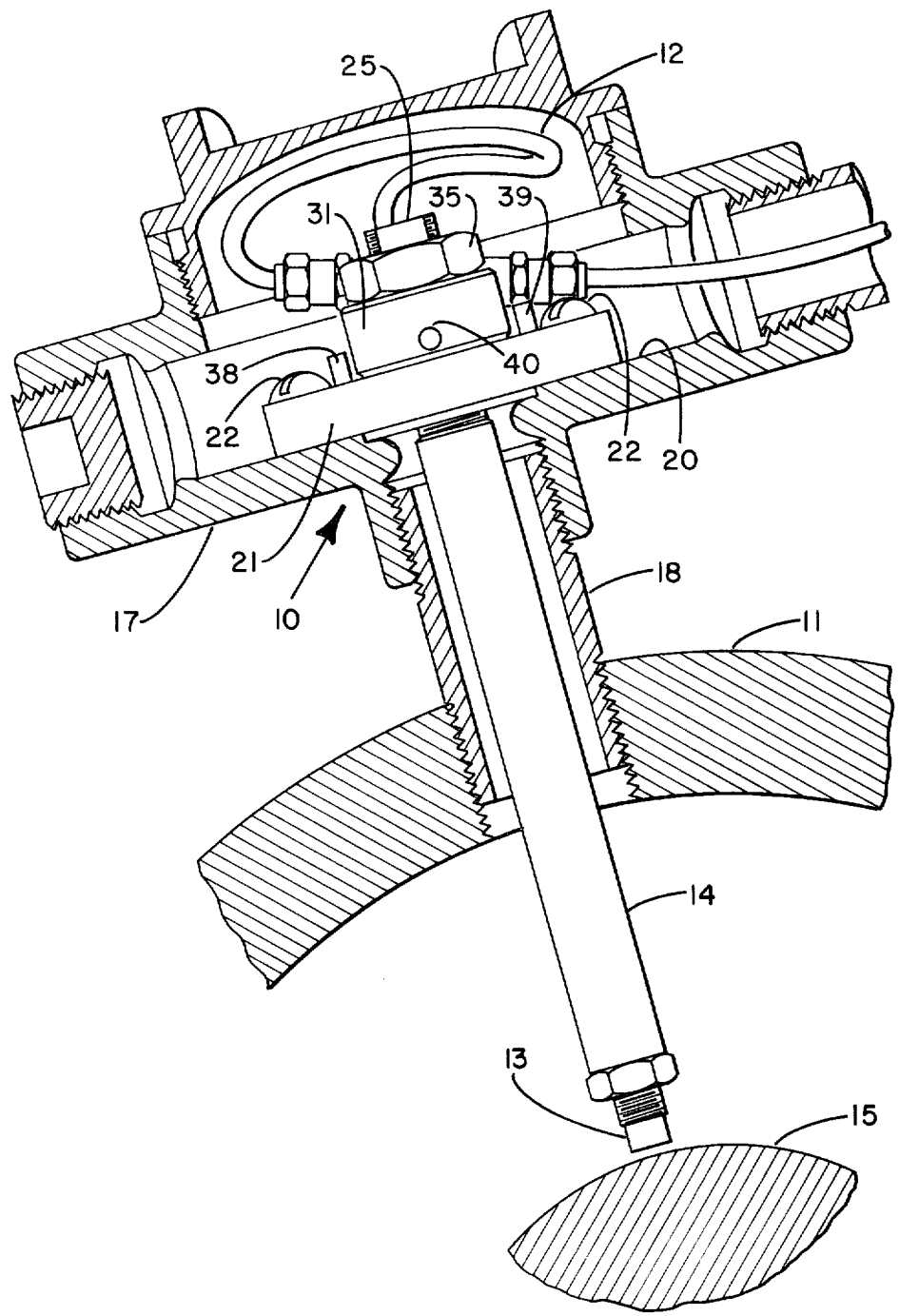
FIG. 1 is a partial sectional view illustrating a probe embodying the teachings of the present invention with the probe being positioned to observe the shaft of a rotary machine.

Referring now to the drawings, there is illustrated an electrical probe system 10 relying upon the Eddy current principle to measure the distance or change between the probe and distance of an observed body over a very small span or gap. In this particular embodiment, the probe assembly is mounted upon the casing 11 of a rotary machine, such as a turbine or the like, and contains a probe or sensing head 13 threaded into an extended probe holder 14 inserted into the machine. The sensing probe is electrically connected to an RF voltage generator (not shown) by means of a cable 12 running through the holder and being carried outside of the machine casing. In this particular embodiment, the body observed is the rotary shaft 15.

It should be clear, however, that the present invention has wider application and can be utilized to detect the position, speed, or vibrations of any type of structure and is not necessarily restricted to the sensing a shaft as herein disclosed.

As is conventionally known in the art, this type of system is composed of a probe which is operatively connected to an RF generator (proximeter) which, in turn, is arranged to deliver an output signal to a read-out device. The RF generator, in conjunction with the probe sensing element, provides a level of voltage that is proportional to the gap distance between the sensing elements and the surface being observed. The term linear range, as herein used, refers to the operating range of the system within which the voltage output of the generator is linear in respect to the distance between the probe and the observed body. Preferably, to obtain accurate reading on both sides of a reference voltage, the probe is placed at the midpoint of the linear operating range (gap distance) of the system. By way of a typical example, such a system may have a linear range which occurs within a 10 mil gap range when the generator is operating at an output level of about −7.5 volts and the body being observed is formed of an alloyed steel. Of course, this range can vary with difference in signal strength or materials observed, however, the linear range, and therefore the gap distance, within which the system operates is generally relatively narrow.

As illustrated in FIG. 1, the probe structure of the present invention is supported within a housing 17, affixed to the machine casing by means of a threaded sleeve 18. A finished surface 20 is machined upon the bottom internal wall of the housing upon which the probe structure 10 is seated. A bush plate 21, being arranged to support the probe structure, is securely affixed to the finished surface 20 by means of mounting screws 22. As can be seen in this particular arrangement, the distance between the bottom surface of the bush plate and the body to be observed, i.e., the shaft 15 of the rotary machine, is ascertainable within generally definable limits depending upon the tolerances involved.

Figure 3:
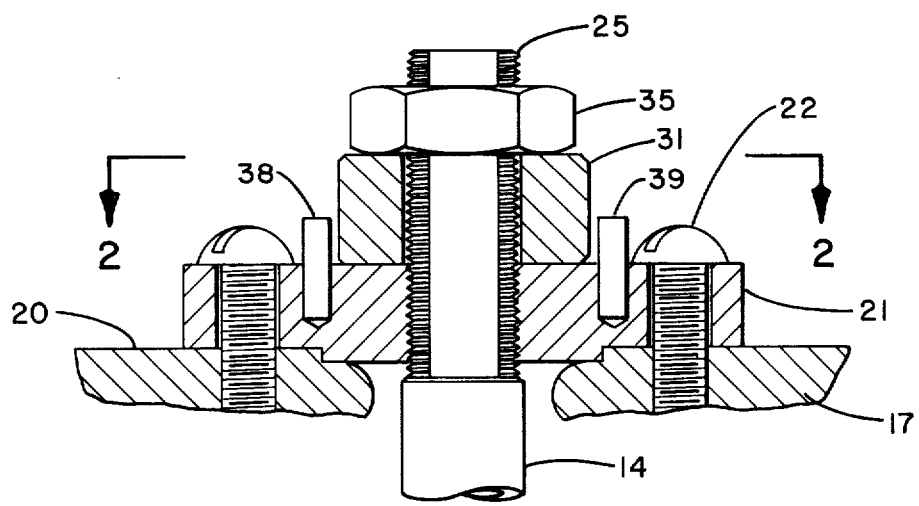
FIG. 3 is a sectional view taken along lines 3—3 in FIG. 2, further illustrating the adjusting and locking mechanism of the present invention.

As more clearly illustrated in FIG. 3, the probe holder, which is in the form of a hollow cylindrical structure, is threaded into the bush plate by means of a threaded shank 25. As seen in FIG. 1, the electrical connection 12 to the probe is brought out of the machine through the inside of the hollow shaft and operatively connected to the RF generator. Sufficient thread length is provided upon the shank to allow the probe holder to be screwed downwardly towards the shaft to bring the probe elements, supported in the free end thereof, into contact with the shaft surface. Upon making contact with the shaft, the probe holder is retracted away from the observed surface a predetermined distance, that is, a distance that will place the probe sensing elements at the midpoint of the system's linear range. For example, if the preferred linear gap range in the typical case cited above occurs between 45 and 55 mils, the probe should be retracted to the midpoint of this range or in other words, to a gap distance of 50 mils from the observed surface. The present assembly utilizes a standard ½ inch – 20 inch thread on the probe holder shank. Accordingly, for every complete turn of the probe holder within the bush plate, the probe will be retracted 50 mils. Thus, by marking the position of the probe holder when in contact with the shaft, and then turning the holder within the stationary bush plate one full revolution, the probe elements will be raised to a position to provide for the desired gap distance.

A pair of opposed flats 27, 28 are machined on either side of the threaded shank 25 adapted to receive a slotted hole 32 formed within adjusting washer 31. The arcuate ends of the slot are arranged to clear the threads on the shank while the parallel walls of the slot provide a close running fit with the flats 27, 28. Once the probe has been positioned at the desired gap distance, the adjusting washer is slipped over the shank and seated upon the top surface of the bush plate as illustrated in FIGS. 1 and 3. A lock nut 35 is then threaded onto the shank and brought into locking contact against the adjustable washer to hold the washer and the probe support stationary in assembly.

Figure 2:
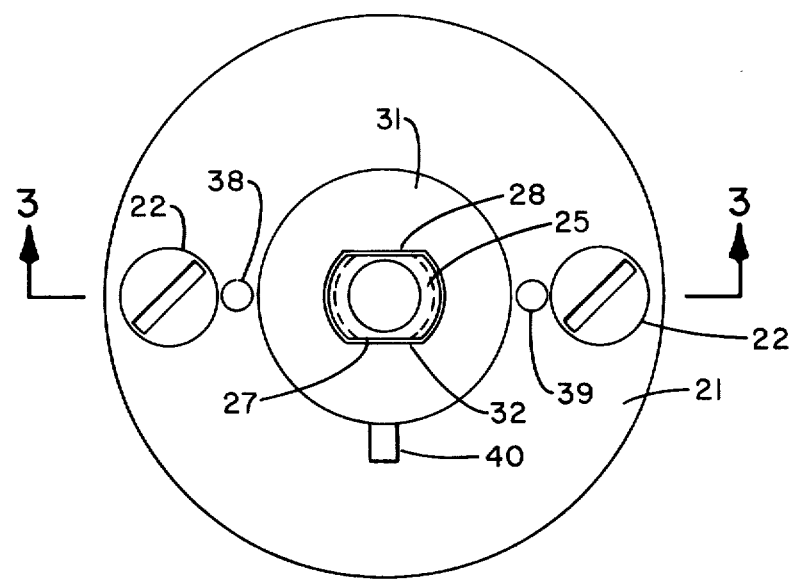
FIG. 2 is a view taken along lines 2—2 in FIG. 1, showing the adjusting means for accurately positioning the probe with the locking mechanism being removed.

With the probe structure so assembled, a pair of vertically aligned stop pins 38, 39 are staked into the bush plate approximately 180° apart. As can be seen in FIG. 2, a third horizontally aligned dowel 40 is also staked into the adjusting washer midway between the two stop pins. The horizontal dowel is of sufficient length so that it will come into contact with the stop pins when the adjusting washer, and thus the probe holder, is moved to either side of the midpoint position.

In practice, depending upon the size of the pins utilized and the arcuate distance between the stop pins, the adjusting washer is permitted to swing through a known displacement when the lock washer is released from a locking condition. As can be seen in this particular arrangement, displacing the adjusting washer either side of its midpoint position, will turn the threaded shank within the bush plate, thus raising or lowering the probe holder, and thus the probe element, a known distance in relation to the observed body. By use of the adjusting washer and the stop arrangement, the present probe assembly can be used, in the sense of a micrometer, to check the scale factor of the proximeter, extension cables, and probe elements. If a particular channel is in doubt, when for example a new probe is inserted into a machine, a scale factor check can be made by simply swinging the pointer of the adjusting washer from one stop position to the other and then calculating the voltage change registered. As can be seen in this manner, the actual scale factor of the system can be generated without resorting to removal of the probe holder from the assembly.

Once the probe assembly has been set up as described above and the machine is in operation, the probe can be removed and accurately replaced without shutting the machine down. To replace the probe, the two screws 22 are removed and the entire assembly including the bush plate retracted through the opening in the casing. The probe element is removed from the holder and a new element threaded therein. With the new element in place, the entire assembly is inserted into the machine, the bush plate seated upon the finished surface and secured in position by means of the screws. As can be seen, the reinserted probe element, being located within the probe assembly at the same location as the original element, is thus positioned at or very near the optimum gap distance without danger of contacting the moving shaft. It should be noted that the probe position can be accurately checked electrically to ascertain if an optimum output voltage is being produced. If for some reason optimum output voltage is not attained upon reinsertion of the probe, the probe can be moved via the adjusting washer until an optimum voltage point is reached. Similarly, scale factor checks of the system can also be accomplished as described.

While this invention has been described with reference to the structure herein disclosed, it is not necessarily confined to the details as set forth, and this application is intended to cover any modifications or changes as may come within the scope of the following claims.

What is claimed is:

1. Apparatus for accurately locating an externally mountable sensing device within a substantially enclosed machine for electrically observing a body contained therein over a defined air gap, the apparatus comprising a mounting structure secured to the outside of the machine adjacent to the observed body and being arranged to support a probe assembly, the structure having an opening coaxially aligned with an opening formed in the machine and a reference surface positioned a predetermined distance from the observed body, a removable probe assembly supported within the mounting structure including, a plate receivable upon said reference surface having a threaded hole therein overlying the opening in the machine, an elongated probe holder being adapted to pass through said opening and having a threaded shank on one end thereof mated into said threaded hole in the plate and an electrical sensing element at the other end positionable in close proximity to the body to be observed, an adjusting means slidably mounted upon the shank end of the probe holder having at least one flat surface for contacting a complementary surface upon the shank whereby rotation of said adjusting means causes the probe holder to be threaded into or out of said plate, stop means operatively associated with the adjusting means for limiting the range of rotation thereof to prevent the sensing element from contacting the observed body, removable clamping means for securing the plate to said reference surface whereby the probe assembly is insertable and removable from said machine.

2. The apparatus of claim 1 wherein said sensing element is operatively connected to a proximeter and said predetermined distance is within the linear operational range of said proximeter.

3. The apparatus of claim 2 having further means for locking said adjusting means against movement whereby the sensing element is securable at an optimum gap distance from said observed body.

4. The apparatus of claim 3 further including an electrical connection extending between the sensing element and the proximeter, said electrical connection passing through an axially extended opening formed in the probe holder.

5. The apparatus of claim 1 wherein said stop means includes an extended member carried by said rotatable adjusting means and being arranged to contact a pair of spaced stop members mounted upon said plate.

* * * * *